US009309331B2

(12) United States Patent
Coburn et al.

(10) Patent No.: US 9,309,331 B2
(45) Date of Patent: Apr. 12, 2016

(54) ALKYL HYDROXYLAMINE COMPOUNDS AND THEIR USE FOR SHORTSTOPPING FREE RADICAL POLYMERIZATIONS

(71) Applicant: ANGUS CHEMICAL COMPANY, Buffalo Grove, IL (US)

(72) Inventors: Charles E. Coburn, Vernon Hills, IL (US); Mrunalini S. Dhamdhere, Vernon Hills, IL (US); Kaustubh Gupte, Mumbai (IN); Mahesh Sawant, Pune (IN)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 0 days.

(21) Appl. No.: 14/431,166

(22) PCT Filed: Sep. 23, 2013

(86) PCT No.: PCT/US2013/061108
§ 371 (c)(1),
(2) Date: Mar. 25, 2015

(87) PCT Pub. No.: WO2014/052212
PCT Pub. Date: Apr. 3, 2014

(65) Prior Publication Data
US 2015/0252121 A1    Sep. 10, 2015

(51) Int. Cl.
*C08F 2/42* (2006.01)
*C08F 2/24* (2006.01)
*C08F 36/04* (2006.01)
*C08F 36/06* (2006.01)
*C08F 236/10* (2006.01)

(52) U.S. Cl.
CPC .. *C08F 2/42* (2013.01); *C08F 36/06* (2013.01)

(58) Field of Classification Search
CPC .......................................................... C08F 2/42
USPC ................................................................. 526/83
See application file for complete search history.

(56) References Cited

U.S. PATENT DOCUMENTS

| 3,148,225 | A |   | 9/1964  | Albert          |         |
|-----------|---|---|---------|-----------------|---------|
| 3,222,334 | A |   | 12/1965 | Demme           |         |
| 3,296,177 | A | * | 1/1967  | Haines et al.   | 524/239 |
| 5,384,372 | A |   | 1/1995  | Lattime         |         |
| 5,504,168 | A |   | 4/1996  | Maestri et al.  |         |
| 6,723,255 | B2|   | 4/2004  | Buszta et al.   |         |

FOREIGN PATENT DOCUMENTS

| EP | 1 083 185      | 3/2001  |
| WO | WO-98/51714    | 11/1998 |
| WO | WO-00/42079    | 7/2000  |
| WO | WO-02/38617    | 5/2002  |
| WO | WO-02/088055   | 11/2002 |
| WO | WO-2010/084130 | 7/2010  |

OTHER PUBLICATIONS

International Preliminary Report on patentability on PCT/US2013/061108, issued Mar. 31, 2015.
International Search Report on PCT/US2013/061108, mailed Dec. 18, 2013.

* cited by examiner

*Primary Examiner* — Fred M Teskin
(74) *Attorney, Agent, or Firm* — Foley & Lardner LLP

(57) ABSTRACT

This invention provides a method for shortstopping free radical polymerization reactions using a shortstopping agent comprising at least two alkyl hydroxylamines (AHAs) selected from the group consisting of primary AHAs, a mixture of at least one of each of primary and secondary AHAs, and salts thereof. A method for producing elastomers using the aforesaid shortstopping agents is also provided.

18 Claims, No Drawings

ALKYL HYDROXYLAMINE COMPOUNDS AND THEIR USE FOR SHORTSTOPPING FREE RADICAL POLYMERIZATIONS

CROSS REFERENCE TO RELATED APPLICATIONS

This application is a U.S. National Phase Application of PCT/US2013/061108, filed Sep. 29, 2013, which claims priority to Indian Application 3054/DEL/2012, filed Sep. 28, 2012, both of which are incorporated by reference in their entireties.

FIELD OF THE INVENTION

This invention relates to a method for shortstopping free radical polymerization reactions using shortstopping agents comprising combinations of primary alkyl hydroxylamines (AHAs), mixtures of at least one primary AHA and at least one secondary AHA, and salts thereof, with the proviso that N-isopropylhydroxylamine (IPHA) is substantially absent. A method for producing elastomers using the aforesaid IPHA-free AHA-based shortstopping agents is also provided.

BACKGROUND OF THE INVENTION

Free radical initiated emulsion polymerization reactions for making elastomers, such as styrene-butadiene rubber, butadiene rubber and acrylonitrile-butadiene rubber, often involve use of shortstopping agents to terminate the polymerization reaction. The polymerization reaction is stopped at a predetermined degree of monomer conversion in order to produce a rubber product with the desired characteristics.

N,N'-diethylhydroxylamine (DEHA) is a widely-used shortstopping agent, however, it is relatively volatile and is readily removed with the unreacted monomers during the steam stripping step. This in turn can result in insufficient DEHA present in the resulting latex emulsion to prevent additional free radical polymerization from occurring and can cause Mooney viscosity drift. Furthermore, subsequent emulsion polymerizations that utilize recovered and recycled monomer streams can contain excessive amounts of DEHA that will deactivate a portion of the initiator package and will ultimately require use of greater amounts of initiator. Since DEHA is derived from secondary alkyl hydroxylamines, the use of DEHA can also result in the formation of precursors to regulated nitrosamines.

N-Isopropylhydroxylamine (IPHA) is also widely used as a shortstopping agent and has the advantage of providing excellent Mooney viscosity control while not contributing to the formation of any regulated nitrosamines, as discussed in U.S. Pat. No. 5,384,372. The class of IPHA compounds includes, for example, N-isopropylhydroxylamine, N-isopropylhydroxylamine acetate, N-isopropylhydroxylamine hydrochloride, and N-isopropylhydroxylamine sulfate, among other known compounds, and is capable of providing control of undesired vapor phase polymer formation (popcorn polymer).

A blend of IPHA and hydroxylamine (HA) is presented in International Patent Application Publication No. WO 2002/0038617 as a nitrosamine-free shortstopping agent having better prevention of popcorn polymer formation than IPHA alone. Hydroxylamine, however, rapidly decomposes, particularly in the presence of metal ions, which creates significant storage and handling issues. On the other hand, U.S. Pat. No. 5,504,168 describes blends of IPHA with polysulphides used as shortstopping agents for emulsion polymerization systems.

International Patent Application Publication No. WO 1998/0051714 teaches the use of N-ethylhydroxylamine (EHA) or its salts as a shortstopping agent for free radical polymerization. This document states that EHA is less volatile than DEHA and IPHA and it can be mixed with other shortstopping agents such as IPHA, DEHA, sodium polysulfide, and sodium dimethyldithiocarbamate. Furthermore, EHA does not produce undesirable nitrosamines.

International Patent Application Publication No. WO 2000/0042079 discloses sterically-hindered alkyl hydroxylamines, such as N-tertiary-butylhydroxylamine and N,N-isopropylmethylhydroxylamine, and their use as free radical scavengers and shortstopping agents.

U.S. Pat. No. 6,723,255 describes shortstopping compositions which contain at least one hydrophilic radical scavenger and at least one hydrophobic radical scavenger. It is shown in this document that shortstopping agents having fewer carbon atoms have greater volatility and water solubility.

In view of the foregoing practices and developments, there remains a need for new and improved shortstopping agents which do not include DEHA or IPHA and exhibit at least two or more of the following properties: 1) excellent shortstopping/Mooney viscosity control, 2) good storage stability/EH&S profile, and 3) do not form detectable levels of regulated nitrosamines.

SUMMARY OF THE INVENTION

The present invention is a method for terminating a free radical initiated emulsion polymerization reaction comprising adding, to an emulsion comprising at least one monomer, a shortstopping agent comprising at least two alkyl hydroxylamine compounds selected from the group consisting of primary alkyl hydroxylamines, a mixture of at least one each of a primary and a secondary alkyl hydroxylamine, and salts thereof, with the proviso that isopropylhydroxylamine (IPHA) is substantially absent.

In some embodiments, the shortstopping agent comprises from 10% to 70% by weight of the at least two AHA compounds, and from 30% to 90% by weight of a solvent, based on the total weight of the shortstopping agent. The solvent may, for example, comprise water.

In some embodiments, the at least two alkyl hydroxylamines comprise a first primary alkyl hydroxylamine and a second primary alkyl hydroxylamine which are present in a weight ratio of first primary AHA to second primary AHA of from 10:90 to 65:35. For example, the first primary alkyl hydroxylamine may be N-ethylhydroxylamine (EHA) and the second primary alkyl hydroxylamine may be N-tertiary-butylhydroxylamine (TBHA).

In some embodiments, the at least two alkyl hydroxylamines comprise a mixture of at least one primary alkyl hydroxylamine and at least one secondary alkyl hydroxylamine. Furthermore, in such embodiments, the primary AHA is present in an amount of at least 50% by weight, based on the total weight of AHAs present in the shortstopping agent.

The present invention also provides a method for producing an elastomer comprising the steps of:
1) conducting, in an emulsion, free-radical emulsion polymerization of a latex comprising a conjugated diene, thereby producing polymerized material;
2) adding to the emulsion a shortstopping agent comprising at least two alkyl hydroxylamine compounds selected from the group consisting of primary alkyl hydroxylamines, a mixture of at least one each of a primary and a secondary alkyl hydroxylamine, and salts thereof, with the proviso that isopropylhydroxylamine (IPHA) is substantially absent; and 3) processing the polymerized material to form said elastomer.

In some embodiments, the elastomer may be a rubber selected from the group consisting of styrene-butadiene rubber, butadiene rubber, and acrylonitrile-butadiene rubber.

In some embodiments, the free-radical emulsion polymerization is performed in a batch-wise mode. In some embodiments, the free-radical emulsion polymerization is performed in a continuous mode.

DETAILED DESCRIPTION OF THE INVENTION

The terms "parts" and "phm (parts per hundred monomers)," as employed in the following examples, refers to parts by weight of shortstopping agent per 100 parts of monomer charged. The dosage and ranges of shortstopping agent are noted on active basis of the substance, not as supplied product concentration.

The term "isopropylhydroxylamine" (IPHA) as used herein includes N-isopropylhydroxylamine, N-isopropylhydroxylamine acetate, N-isopropylhydroxylamine hydrochloride, N-isopropylhydroxylamine sulfate, and mixtures thereof. N-isopropylhydroxylamine, for example, is commercially available from ANGUS Chemical Company of Buffalo Grove, Ill. and is known for use as a primary component of short stopping agents for free radical initiated emulsion polymerization reactions for making elastomers.

The terms "substantially absent" and "IPHA-free" are used herein to mean the absence of IPHA in the short stopping agents of the present invention and, more specifically means that IPHA may only be present in amounts less than 0.2% by weight, based on the total weight of the AHAs present in the shortstopping agents.

The present invention provides a method for terminating free radical initiated emulsion polymerization reactions by the addition, to an emulsion comprising at least one monomer, of a shortstopping agent which comprises at least two alkyl hydroxylamine (AHA) compounds selected from the group consisting of primary alkylhydroxylamines, a mixture of at least one each of a primary and a secondary alkyl hydroxylamine, and salts thereof, with the proviso that isopropylhydroxylamine (IPHA) is substantially absent from the shortstopping agent. As used herein, "a mixture of at least one each of a primary and a secondary alkyl hydroxylamine" means a mixture of AHAs that contains at least one primary alkyl hydroxylamine and at least one secondary alkyl hydroxylamine.

These IPHA-free short stopping agents provide excellent shortstopping/Mooney viscosity control, have very good storage stability and handling characteristics, and provide good popcorn polymer control, even though no IPHA is present. A further benefit is that the short stopping agents of the present invention which include primary alkyl hydroxylamines do not form nitrosamine precursors and allows manufacture of rubber compliant with the German TRGS 552 regulation.

In accordance with the present invention, suitable primary alkyl hydroxylamines and their salts may, for example without limitation, be selected from the group consisting of N-methylhydroxylamine (MHA), N-ethylhydroxylamine (EHA), N-propylhydroxylamine (PHA), N-tertiary-butylhydroxylamine (TBHA), and mixtures thereof, but not IPHAs.

Suitable secondary alkylhydroxylamines and their salts may, for example without limitation, be selected from the group consisting of N,N-dimethylhydroxylamine (DMHA), N,N-isopropylmethylhydroxylamine (IPMHA), and mixtures thereof. These combinations provide good shortstopping, excellent Mooney viscosity control, and popcorn polymer control. It is noted that some secondary alkyl hydroxylamines are capable of forming undesirable nitrosamine precursors, and so they are less desirable than the primary alkyl hydroxylamines.

In some embodiments, the at least two alkyl hydroxylamines (AHAs) of the IPHA-free shortstopping agent comprise a first primary AHA and a second primary AHA which is different from the first primary AHA. In such embodiments, the primary AHAs are present in the shortstopping agent, for example without limitation, in a weight ratio of first primary AHA to second primary AHA of from 10:90 to 65:35. Furthermore, in such embodiments, for example, without limitation, the first primary AHA may comprise N-ethylhydroxylamine (EHA) and the second primary AHA may comprise N-tertiary-butylhydroxylamine (TBHA).

In still other embodiments, the at least two alkyl hydroxylamines comprise a mixture of at least one primary alkyl hydroxylamine and at least one secondary alkyl hydroxylamine. In such embodiments, the primary and secondary AHAs are present in the shortstopping agent, for example without limitation, in a weight ratio of [total primary AHAs] to [total secondary AHAs] of from 90:10 to 50:50. To minimize the potential for nitrosamine formation, it is preferred that, where the shortstopping agent comprises both a primary and a secondary AHA (i.e., at least one of each), the shortstopping agent comprises greater than 50% by weight of the primary AHA, for example, greater than 60%, or greater than 70%, or even greater than 80% of the primary AHA, based on the total amount of AHAs present in the shortstopping agent.

Likewise, in further embodiments, the at least two AHAs of the IPHA-free shortstopping agent of the present invention may comprise two or more primary AHAs and at least one secondary AHA, or even at least one primary AHA and two or more secondary AHAs. In any case, the above-mentioned suitable weight ratios of AHAs contained in the shortstopping agents of the present invention are understood to be measured as the ratio of [total primary AHAs] to [total secondary AHAs] present in the shortstopping agent.

These IPHA-free, AHA-based shortstopping agents should provide favorable liquid-gas phase distribution of the shortstopping active ingredients (i.e., the AHAs), thereby providing acceptable short-stopping effectiveness in the vapor phase as well as the liquid phase. Furthermore, in order to ensure higher activity of the shortstopping agent in the organic (i.e., latex) phase during radical polymerization reactions, it is beneficial to have higher solubility of the active ingredients (e.g., AHA's) in organic solvents to facilitate its migration from the aqueous to the organic phase.

According to the method of the present invention, the shortstopping agent is added, to the emulsion comprising at least one monomer to be polymerized, in an amount of from 0.01 to 0.25 parts per hundred parts of the at least one monomer (phm). For example, the shortstopping agent may suitably be added to the emulsion in an amount of from 0.01 to 0.1 phm, or from 0.3 to 0.2 phm, or even from 0.04 to 0.2 phm.

The manner by which the shortstopping agent is added to the emulsion is not particularly limited and should be commensurate with conventional techniques used in rubber polymerization processes. For example, the at least two AHAs may first be combined with a solvent, such as water, and then added to the emulsion when the desired monomer conversion has been reached.

The shortstopping agent of the present invention, comprising at least two AHAs, but wherein IPHA is substantially absent, may be advantageously employed in any addition polymerization system which proceeds through a free radical emulsion polymerization mechanism. The emulsion polymerization process may be performed in a batch-wise or continuous mode. The method of the present invention may, for example, be advantageously applied to emulsion polymerization reactions which produce styrene-butadiene rubber (SBR), butadiene rubber (BR), and acrylonitrile-butadiene rubber (NBR) and polychloroprene.

Moreover, the method of the present invention is not dependent on the free radical polymerization reaction using any particular initiator, activator, reducing agent, complex forming agent, buffer, oxygen-combining substances, emulsifier, dispersing agent, modifier, and the like. As is common, a chain transfer agent may be used to avoid excessive gel formation and control the average molecular weight. The type of chain transfer agent employed is also not particularly limited in accordance with the present invention. Other shortstopping agents and radical scavengers may also be combined with the IPHA-free AHA-based shortstopping agent described herein, including for example, without limitation, DEHA, sodium dimethyldithiocarbamate, sodium tetrasulphide, hydroxylamine, and sodium nitrite.

The temperature of the polymerization may range from 0° C. to 100° C. If a hot polymerization recipe is used, the temperature of the polymerization generally ranges from about 40° C. to about 70° C. A hot polymerization is generally carried out to monomer conversion ranging from 80% to 90%. The temperature of a cold polymerization generally ranges from about 0° C. to 25° C. The cold polymerization is generally carried out to monomer conversion ranging from about 55% to 65%.

The IPHA-free AHA-based shortstopping agents according to the present invention are expected to provide better overall shortstopping performance compared to previously known DEHA-based shortstopping agents. In fact, when the AHAs are only primary AHAs, there are no nitrosamines in the resulting rubber products.

Lastly, the need for additional free radical scavengers in monomer recovery portions of the emulsion polymerization reactions areas of the polymerization plant is reduced when the IPHA-free AHA-based shortstopping agents described herein are employed in accordance with the method of the present invention.

The practice of this invention is further illustrated by reference to the following examples which are intended to be representative rather than restrictive of the scope of this invention.

EXAMPLES

Modelling Characteristics of Inventive IPHA-free Shortstopping Agents Comprising Two Different Primary AHAs It is believed that adequate partitioning of the shortstopping agents into the organic phase is required to stabilize the organic phase, it is believed that avoiding use of IPHA in shortstopping blends, and including only other primary and/or secondary AHAs which have beneficial characteristics relevant to these desired properties, should produce better performing shortstopping agents. To estimate these properties of such IPHA-free AHA-based blends, computer-based models were used to predict the distribution ratios and partitioning coefficient into organic phase of low-IPHA containing blends with at least two primary AHAs, in different relative amounts, as listed in the examples below.

The particular computer modelling software and inputs used are as follows:
Software Name: Gaussian
Company/Manufacturer: Gaussian Inc.
Version: Gaussian 09
Used for: Calculating reactivities of AHA.
Electronic energies, vibrational frequencies, rotational constants were calculated at CBS-QB3 level of theory
Rate constants were calculated using canonical transition state theory.
Tunnelling effect was calculated using Skodje-Truhlar method.
Rate constants were calculated for H-atom abstraction reactions using ethyl radical from AHAs.
Software Names:
Turbomole
COSMOtherm
Company/Manufacturer: COSMOlogic GmbH
Versions:
TURBOMOLE V5-5
COSMOtherm X11 C_21_0111_a, parameterization file: BP_TZVP_C21_0111.ctd
Used for: Distribution ratio (DR) calculations and partition coefficient calculations.
Turbomole was used for quantum chemical calculations.
COSMOtherm was used to predict DR and partition coefficient using Turbomole generated COSMO files.
DR was calculated at 1 wt % AHA in water at 70° C.

To improve accuracy of DR calculations, COSMOtherm requires experimental vapor pressure data. The vapor pressure data provided to COSMOtherm as an input is given below. COSMOtherm predicted vapour pressures were used for AHA other than TBHA, IPHA and EHA:

| TBHA | | IPHA | | EHA | |
| --- | --- | --- | --- | --- | --- |
| T (°C.) | PVtot (mPa) | T (°C.) | PVtot (mPa) | T (°C.) | PVtot (mPa) |
| 0.0 | 0.3 | 0.0 | 0.4 | 0.0 | 0.7 |
| 15.8 | 1.4 | 15.0 | 1.5 | 14.2 | 2.6 |
| 31.6 | 5.2 | 30.0 | 5.5 | 28.4 | 8.6 |
| 47.3 | 16.5 | 45.0 | 16.9 | 42.7 | 24.6 |
| 63.1 | 44.8 | 60.0 | 45.2 | 56.9 | 62.2 |
| 78.9 | 106.9 | 75.0 | 106.9 | 71.1 | 140.9 |
| 94.7 | 228.2 | 90.0 | 227.3 | 85.3 | 290.1 |
| 110.4 | 442.7 | 105.0 | 440.9 | 99.6 | 549.2 |
| 126.2 | 791.0 | 120.0 | 789.7 | 113.8 | 966.0 |
| 142.0 | 1317.6 | 135.0 | 1320.4 | 128.0 | 1593.7 |

Predicted Reactivity Orders of AHAs: EHA≥IPHA>TBHA

Various AHA Solubilities at 25° C., in water (experimentally measured)
EHA~50%
IPHA~20%
TBHA~12%

Ethylbenzene was used in lieu of the organic phase for modelling purposes. The extent of partitioning, i.e., the partitioning coefficient, in organic phase (ethylbenzene) is calculated by predicting the quantity:

$$\frac{X_{AHA(EB)}}{X_{AHA(H2O)}}$$

which is the ratio of total mole fraction of AHA in ethylbenzene to total mole fraction of AHA in water. A partitioning coefficient, $X_{AHA(EB)}/X_{AHA(H2O)}$, of ≥1 will be desired.

The distribution ratio (DR) and partitioning coefficient was calculated and predicted by the above-mentioned software models as reported in Table 1 below. In accordance with the present invention, it is preferred that the AHA blend have a DR greater than the DR of 100% IPHA, since it is believed this value indicates the blend will be able to suppress popcorn formation.

TABLE 1

Blends of Primary AHA's

| Blend ID | DEHA (wt %) | IPHA (wt %) | EHA (wt %) | TBHA (wt %) | DR** (70° C.) | Partition Coefficient*** |
|---|---|---|---|---|---|---|
| Comp. 1* | | 100 | | | 5.36 | 1.6 |
| Comp. 2* | 100 | | | | 52.96 | 29.56 |
| G | | 0 | 10 | 90 | 11.9 | 4.43 |
| H | | 0 | 20 | 80 | 10.06 | 2.77 |
| D | | 0 | 30 | 70 | 9.4 | 1.95 |
| C | | 0 | 45 | 55 | 7.67 | 1.27 |
| B | | 0 | 50 | 50 | 7.2 | 1.12 |
| A | | 0 | 55 | 45 | 6.75 | 1.0 |
| F | | 0 | 60 | 40 | 6.3 | 0.88 |
| E | | 0 | 65 | 35 | 5.8 | 0.79 |

*Comp. = Comparative
**DR = Distribution Ratio predicted by COSMOtherm software
***$X_{AHA(EB)}/X_{AHA(H2O)}$ as predicted by COSMOtherm software, at 25° C.

TABLE 2

Blends of Primary and Secondary AHAs

| Blend ID | DEHA (wt %) | IPHA (wt %) | EHA (wt %) | IPMHA^ (wt %) | DR** (70° C.) | Partition Coefficient*** |
|---|---|---|---|---|---|---|
| Comp. 1* | | 100 | | | 5.36 | 1.6 |
| Comp. 2* | 100 | | | | 52.96 | 29.56 |
| A | | 0 | 60 | 40 | 13.7 | 0.93 |
| B | | 0 | 50 | 50 | 16.8 | 1.19 |
| C | | 0 | 40 | 60 | 19.8 | 1.58 |
| D | | 0 | 20 | 80 | 27.1 | 3.22 |
| F | | 0 | 10 | 90 | 31.12 | 5.61 |

*Comp. = Comparative
**DR = Distribution Ratio predicted by COSMOtherm software
***$X_{AHA(EB)}/X_{AHA(H2O)}$ as predicted by COSMOtherm software, at 25° C.
^IPMHA is N,N-isopropylmethylhydroxylamine, a secondary AHA The modeling results are known to deviate from the experimental findings. Owing to this uncertainty, the predictions should be viewed on a comparative basis.

We claim:

1. A method for terminating a free radical initiated emulsion polymerization reaction comprising: adding a shortstopping agent to an emulsion comprising at least one monomer to be polymerized, wherein
the shortstopping agent comprises at least two alkyl hydroxylamine compounds selected from the group consisting of
primary alkyl hydroxylamines, and
a mixture of at least one each of primary and secondary alkyl hydroxylamines,
with the proviso that N,N'-diethylhydroxylamine (DEHA) and isopropylhydroxylamine (IPHA) are absent.

2. The method of claim 1, wherein the shortstopping agent comprises:
   a. from 10% to 70% by weight of the at least two alkyl hydroxylamine compounds, based on the total weight of the shortstopping agent; and
   b. from 30% to 90% by weight of a solvent, based on the total weight of the shortstopping agent.

3. The method of claim 1, wherein said primary alkyl hydroxylamines are selected from the group consisting of: N-methylhydroxylamine (MHA), N-ethylhydroxylamine (EHA), N-propylhydroxylamine (PHA), N-tertiary-butylhydroxylamine (TBHA), and mixtures thereof.

4. The method of claim 1, wherein said secondary alkyl hydroxylamines are selected from the group consisting of: N,N-dimethylhydroxylamine (DMHA), N,N-isopropylmethylhydroxylamine (IPMHA), and mixtures thereof.

5. The method of claim 1, wherein the at least two alkyl hydroxylamines comprise a first primary alkyl hydroxylamine and a second primary alkyl hydroxylamine, wherein the first primary alkyl hydroxylamine and the second primary alkyl hydroxylamine are present in a weight ratio of from 10:90 to 65:35.

6. The method of claim 1, wherein the at least two alkyl hydroxylamines comprise a mixture of at least one primary alkyl hydroxylamine and at least one secondary alkyl hydroxylamine, wherein the at least one primary alkyl hydroxylamine and the at least one secondary alkyl hydroxylamine are present in a weight ratio of from 90:10 to 50:50.

7. The method of claim 6, wherein said mixture comprises greater than 50% by weight of the at least one primary alkyl hydroxylamine, based on the total weight of the primary and secondary alkyl hydroxylamines.

8. The method of claim 1, wherein said shortstopping agent is added to said emulsion in an amount of from 0.01 to 0.25 parts per hundred parts of the at least one monomer.

9. A method for producing an elastomer comprising:
   1) conducting in an emulsion, a free-radical emulsion polymerization of a latex comprising a conjugated diene, thereby producing polymerized material;
   2) adding to the emulsion a shortstopping agent comprising at least two alkyl hydroxylamine compounds selected from the group consisting of:
      (a) primary alkyl hydroxylamines, and
      (b) a mixture of at least one of each of primary and secondary alkyl hydroxylamines,
   with the proviso that N,N'-diethylhydroxylamine (DEHA) and isopropylhydroxylamine (IPHA) are absent; and
   3) processing the polymerized material to form said elastomer.

10. The method of claim 9, wherein said elastomer is a rubber selected from the group consisting of styrene-butadiene rubber, butadiene rubber, and acrylonitrile-butadiene rubber.

11. The method of claim 9, wherein the free-radical emulsion polymerization is performed in a batch-wise mode.

12. The method of claim 9, wherein the free-radical emulsion polymerization is performed in a continuous mode.

13. The method of claim 9, wherein the free-radical emulsion polymerization has a temperature from 0° C. to 100° C.

14. The method of claim 1, wherein the shortstopping agent comprises at least two or more primary alkyl hydroxylamines and at least one secondary alkyl hydroxylamine.

15. The method of claim 1, wherein the shortstopping agent comprises at least one primary alkyl hydroxylamine and at least two or more secondary alkyl hydroxylamines.

16. The method of claim 1, wherein said shortstopping agent is added to said emulsion in an amount of from 0.04 to 0.2 parts per hundred parts of the at least one monomer.

17. The method of claim 1, wherein the at least two alkyl hydroxylamines comprise a mixture of at least one primary alkyl hydroxylamine and at least one secondary alkyl hydroxylamine, wherein the at least one primary alkyl hydroxylamine and the at least one secondary alkyl hydroxylamine are present in a weight ratio of from 90:10 to 60:40.

18. A method for terminating a free radical initiated emulsion polymerization reaction comprising: adding a shortstopping agent to an emulsion comprising at least one monomer to be polymerized, wherein the shortstopping agent comprises at least two primary alkylhydroxylamines selected from the group consisting of N-ethylhydroxylamine (EHA), N-tertiary-butylhydroxylamine (TBHA), and salts thereof, wherein the EHA and TBHA are present in a weight ratio of from 10:90 to 65:35.

* * * * *